(12) United States Patent
Tamaki

(10) Patent No.: US 12,109,979 B2
(45) Date of Patent: Oct. 8, 2024

(54) LOCKING DEVICE FOR OPENING/CLOSING BODY

(71) Applicant: PIOLAX, INC., Kanagawa (JP)

(72) Inventor: Satoru Tamaki, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 325 days.

(21) Appl. No.: 17/437,661

(22) PCT Filed: Mar. 9, 2020

(86) PCT No.: PCT/JP2020/010061
§ 371 (c)(1),
(2) Date: Sep. 9, 2021

(87) PCT Pub. No.: WO2020/189379
PCT Pub. Date: Sep. 24, 2020

(65) Prior Publication Data
US 2022/0161731 A1    May 26, 2022

(30) Foreign Application Priority Data

Mar. 15, 2019    (JP) .................................. 2019-048782

(51) Int. Cl.
*B60R 7/06*        (2006.01)
*E05B 83/30*    (2014.01)
(Continued)

(52) U.S. Cl.
CPC ............... *B60R 7/06* (2013.01); *E05B 83/30* (2013.01); *E05C 9/04* (2013.01); *E05C 21/00* (2013.01)

(58) Field of Classification Search
CPC ........... Y10T 292/0834; Y10T 292/084; Y10T 292/0846; Y10T 292/0997;
(Continued)

(56) References Cited

U.S. PATENT DOCUMENTS

| 2011/0174027 A1 | 7/2011 | Ookawara et al. |
| 2017/0044803 A1* | 2/2017 | Nakasone ............... E05B 77/36 |
| 2020/0308881 A1 | 10/2020 | Nakasone |

FOREIGN PATENT DOCUMENTS

| CN | 106062296 | * 10/2016 |
| EP | 1188886 A1 | 3/2002 |

(Continued)

OTHER PUBLICATIONS

Apr. 28, 2020, International Search Report issued for related PCT application No. PCT/JP2020/010061.
(Continued)

*Primary Examiner* — Christine M Mills
*Assistant Examiner* — Yahya Sidky
(74) *Attorney, Agent, or Firm* — Paratus Law Group, PLLC

(57) ABSTRACT

A locking device includes a lock portion on one of a fixed body or an opening/closing body, a rod on the other member, and a protrusion protruding from the other member. The rod has a recess surrounded by a pair of first walls facing each other in a sliding direction of the rod and a pair of second walls facing each other in a direction orthogonal to the sliding direction. A first elastic piece extends from one of the first walls toward the other and applies an elastic force against a tip end surface of the protrusion, and a pair of second elastic pieces extend from the second walls. Each of the second elastic pieces has a receiving surface that engages with a back surface of a flange portion of the protrusion, and is configured to elastically abut against a side surface of the protrusion.

9 Claims, 14 Drawing Sheets

(51) Int. Cl.
*E05C 9/04* (2006.01)
*E05C 21/00* (2006.01)

(58) Field of Classification Search
CPC ............ Y10T 292/1022; Y10S 292/38; Y10S 292/53; Y10S 292/54; Y10S 292/51; Y10S 292/55; E05B 15/1635; E05B 2015/165; E05B 83/28; E05B 83/30; E05B 79/02; E05B 79/08; E05B 79/18; E05C 9/04
See application file for complete search history.

(56) References Cited

FOREIGN PATENT DOCUMENTS

| | | | | | |
|---|---|---|---|---|---|
| JP | 2010-106634 | A | 5/2010 | | |
| JP | 5054657 | B2 | 10/2012 | | |
| JP | 2013-023995 | A | 2/2013 | | |
| WO | WO 2010/038716 | A1 | 4/2010 | | |
| WO | WO-2017078121 | A1 * | 5/2017 | ............... | B60R 7/06 |
| WO | WO 2018/008597 | A1 | 1/2018 | | |
| WO | WO-2018216521 | A1 * | 11/2018 | ............... | B60R 7/06 |

OTHER PUBLICATIONS

Apr. 28, 2020, International Search Opinion issued for related PCT application No. PCT/JP2020/010061.

* cited by examiner

LOCKING DEVICE FOR OPENING/CLOSING BODY

CROSS REFERENCE TO PRIOR APPLICATION

This application is a National Stage Patent Application of PCT International Patent Application No. PCT/JP2020/010061 (filed on Mar. 9, 2020) under 35 U.S.C. § 371, which claims priority to Japanese Patent Application No. 2019-048782 (filed on Mar. 15, 2019), which are all hereby incorporated by reference in their entirety.

TECHNICAL FIELD

The present invention relates to a locking device for an opening and closing body for locking the opening and closing body, which is openably and closably attached to an Opening portion of a fixed body, to a closed state.

BACKGROUND ART

For example, an opening and closing body such as a lid is openably and closably attached to an opening portion formed in a fixed body such as a glove box of an automobile. A locking device is provided between the opening portion and the opening and closing body so as to lock the opening and closing body when the opening and closing body is closed and to release the lock when the opening and closing body is opened. The locking device includes, for example, a lock portion formed in the opening portion of the fixed body such as an instrument panel, and a rod slidably disposed in the opening and closing body such as the lid of the glove box. The lid can be opened and closed with respect to the opening portion by engaging and disengaging a rod tip end portion with the lock portion. However, in the case of a long rod, rattling is often caused by vibration during traveling, and abnormal noise may be generated. Therefore, a locking device having a structure of preventing the rattling of the rod may be used.

As the locking device as described above, Patent Literature 1 below discloses a side locking device as shown in FIG. 14. In the side locking device, a rod-like slide member 2 (corresponding to the above rod) is mounted on a hack surface of a front panel 1 of a glove box for a vehicle so as to be movable in a lateral direction, a slide contact wall 3 extending in the lateral direction is formed to stand on the back surface of the front panel 1, a recess 4 into which the slide contact wall 3 is inserted and disposed is formed in the slide member 2, and an elastic piece in which a free end is in sliding contact with the slide contact wall 3 is formed in an intermediate portion of the recess 4 in a longitudinal direction. In a closed state of the front panel, the elastic piece includes a pair of first elastic pieces arranged to face each other in an up-down direction, and a second elastic piece 6 that is elastically deflectable in a front-rear direction of the front panel. Free ends of the pair of first elastic pieces elastically abut against both sides of the slide contact wall 3, so that the slide member 2 is prevented from rattling in the up-down direction. On the other hand, the free end of the second elastic piece 6 elastically attaches an upper end of the slide contact wall 3, so that the slide member 2 is prevented from rattling in the front-rear direction.

CITATION LIST

Patent Literature

Patent Literature 1: Japanese Patent No. 5054657

SUMMARY OF INVENTION

Technical Problem

In the side locking device according to Patent Literature 1, as shown in FIG. 14, the free end of the second elastic piece 6 abuts against the upper end of the slide contact wall 3 and is deflected and deformed, so that a reaction force thereof causes the slide member 2 itself to move in an arrow A direction in FIG. 14. At this time, a tip end portion of the slide member 2 engages with a lock portion 7 on an instrument panel side, and thus a movement of the slide member 2 is restricted. However, when machining accuracy of the lock portion 7 is low and an engagement position of the tip end portion of the slide member 2 is changed, a deflection amount of the second elastic piece 6 may not be stabilized. Since the second elastic piece 6 is formed at the intermediate portion in the longitudinal direction of the slide member 2, a distance L between a portion which applies an elastic force to the upper end of the slide contact wall 3 by the second elastic piece 6 (the free end of the second elastic piece 6) and the lock portion 7 which restricts the movement of the slide member 2 becomes relatively long. Therefore, it is difficult to prevent the rattling of the slide member 2.

Therefore, an object of the present invention is to provide a locking device for an opening and closing body in which the deflection amount of the first elastic piece can be stabilized and the rattling of the rod can be sufficiently prevented.

Solution to Problem

According to an aspect of the present invention, there is provided a locking device for an opening and closing body that is openably and closably attached to an opening portion of a fixed body, the locking device including:

a lock portion provided on one of the fixed body or the opening and closing body;

a rod disposed on the other member of the fixed body or the opening and closing body and configured to slide via an operation member to engage with and disengage from the lock portion; and a protrusion protruding from the other member of the fixed body or the opening and closing body, in which the rod has a recess surrounded by a pair of first walls disposed to face each other in a sliding direction of the rod and a pair of second walls disposed to face each other in a direction orthogonal to the sliding direction, the protrusion is disposed inside the recess or inside and outside the recess, and is provided with a flange portion provided on a tip end side in a protruding direction of the protrusion, the rod has a first elastic piece that extends from one of the pair of first walls toward the other and applies an elastic force by being elastically abutted against a tip end surface of the protrusion in the protruding direction, and a pair of second elastic pieces that extend from an inner surface or an outer surface of the pair of second walls, and each of the second elastic pieces has a receiving surface that engages with a back surface of the flange portion, and is configured to elastically abut against a side surface of the protrusion.

Advantageous Effects of Invention

According to the present invention, in a. state in which the protrusion is disposed inside the recess, or the protrusion is disposed inside and outside the recess, and the rod is disposed on the fixed body or the opening and closing body, the first elastic piece elastically abuts against the tip end surface of the protrusion (hereinafter, also referred to as "elastic contact"), and the pair of second elastic pieces elastically contact the side surface of the protrusion. Therefore, rattling of the rod in a vertical direction and a parallel direction with respect to a rod disposition surface of the other member (the opening and closing body or the like) is prevented. At this time, as the first elastic piece comes into elastic contact with the tip end surface of the protrusion, a reaction force causes the rod to move in a direction away from the other member. However, since the receiving surfaces of the pair of second elastic pieces are engaged with the back surface of the flange portion of the protrusion, the movement of the rod in the direction away from the rod disposition surface of the other member can be restricted. In the locking device, since the receiving surface of the second elastic piece that restricts the movement of the rod in the direction away from the rod disposition surface of the other member can be provided on the same rod as the rod provided with the first elastic piece, a distance between a portion of the first elastic piece that applies the elastic force to the tip end surface of the protrusion and the receiving surface that restricts the movement of the rod can be shortened, and the deflection amount of the first elastic piece can be stabilized, and the rattling of the rod can be sufficiently prevented.

DESCRIPTION OF EMBODIMENTS

Hereinafter, an embodiment of a locking device for an opening and closing body according to the present invention will be described with reference to FIGS. 1 to 7.

Figure 1:
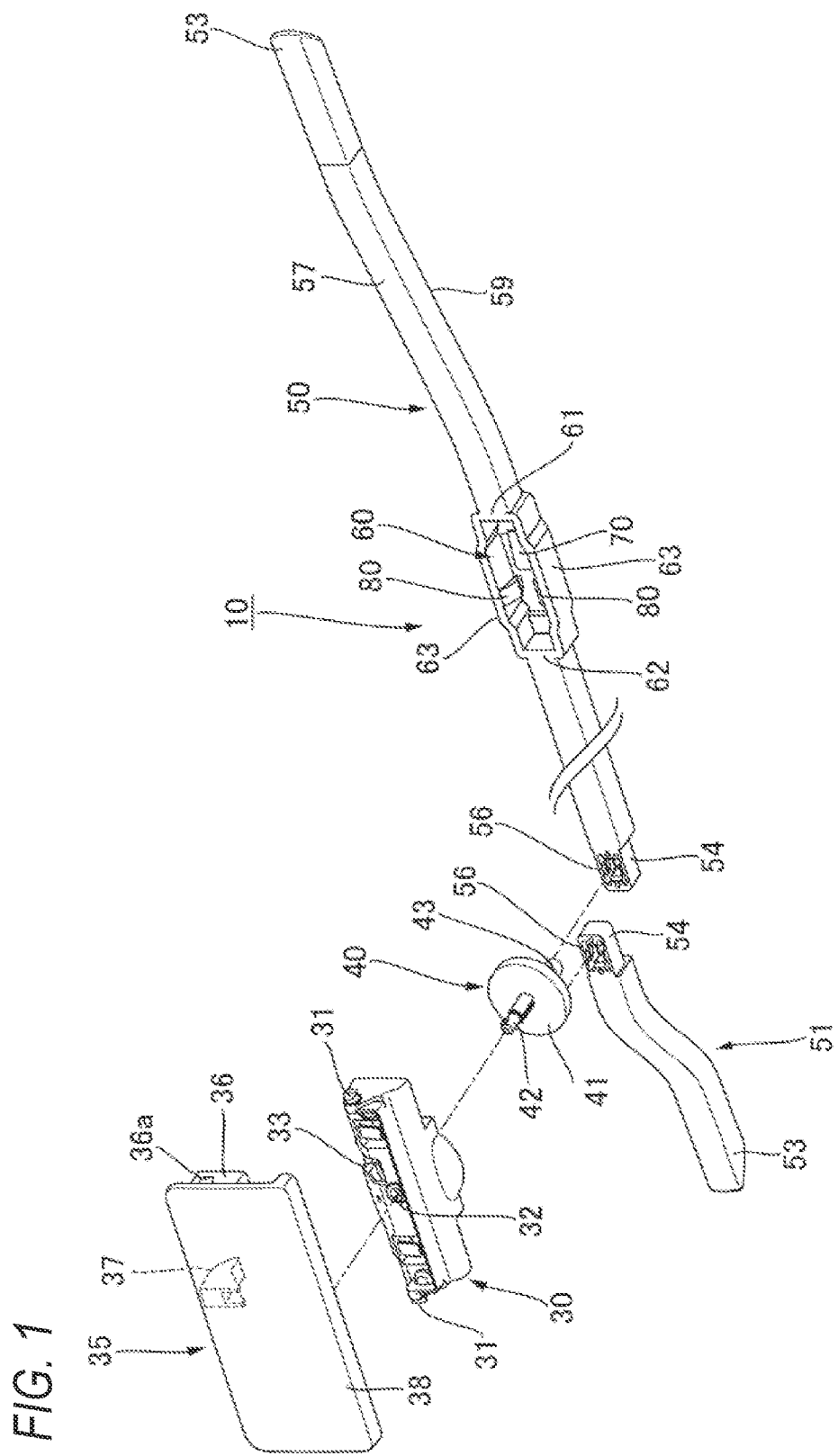
FIG. 1 is an exploded perspective view showing an embodiment of a locking device for an opening and closing body according to the present invention.
Figure 2:
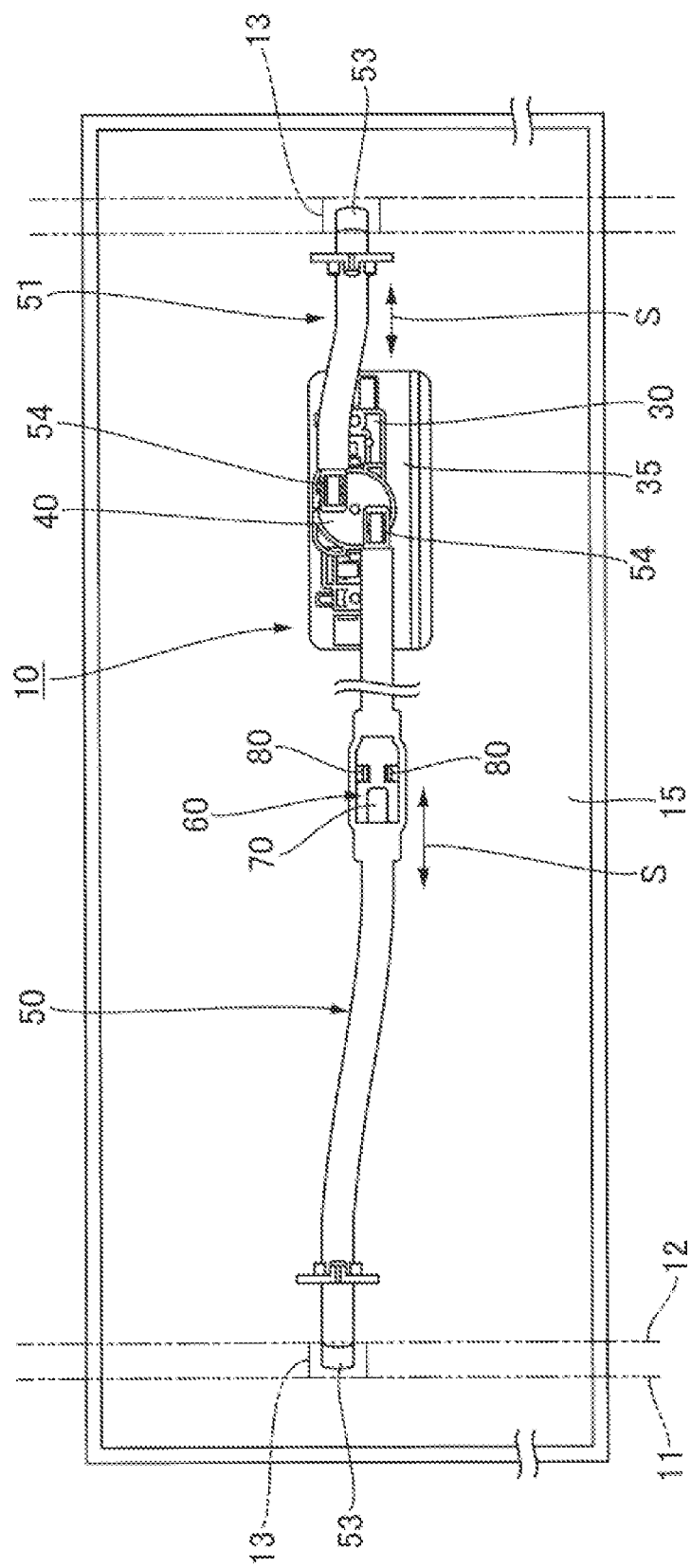
FIG. 2 is an explanatory diagram of the locking device when the opening and closing body is locked in a closed state.

As shown in FIGS. 1 and 2, a locking device 10 of an opening and closing body (hereinafter, referred to as the "locking device 10") in the present embodiment is used, for example, to open and close an opening and closing body 15 such as a glove box that is operably and closably attached to an opening portion 12 of a fixed body 11 such as an instrument panel of a vehicle.

The locking device 10 according to the present embodiment includes a pair of lock portions 13 and 13 (see FIG. 2) provided in the opening portion 12 of the fixed body 11, a base member 30 attached to the opening and closing body 15, a pair of rods 50 and 51 slidably disposed with respect to the opening and closing body 15 and sliding via an operation member 35 to engage with and disengage from the lock portions 13 and 13, a rotation member 40 for interlocking the sliding operation of the pair of rods 50 and 51, and the operation member 35 rotatably attached to a front side of the base member 30 and sliding the rods 50 and 51 by moving a holding portion 38 close to or away from the base member 30. Tip end portions 53 and 53 of the rods 50 and 51 are biased in a direction to be engaged with the lock portions 13 by a biasing unit (not shown). Furthermore, the pair of rods 50 and 51 in the present embodiment are slidably disposed on a back surface side of the opening and closing body 15. However, the opening and closing body may be a structure formed of an outer panel and an inner panel. The rod may be slidably disposed between the outer panel and the inner panel, In the present embodiment, a recess 60 is provided in one of the pair of rods 50 and 51.

The "front side" means a surface located in a direction in which the opening and closing body is opened from an opening portion of the fixed body such as the vehicle. The same applies to a "front surface side". When the fixed body is provided in the vehicle, a vehicle interior space side of the vehicle may be set to the "front side" or the "front surface side". Further, a "back side" or a "back surface side" means a surface opposite to the "front side" or the "front surface side", that is, a surface located in a direction in which the opening and closing body is closed. The "front side", the "front surface side", the "back side", and the "back surface side" have the same meaning in other members (the operation member 35 and the like) described below.

In the base member 30, a pair of shaft portions 31 and 31 are provided to protrude on both side portions in a width direction of the base member 30, and a shaft support hole 32 and a notch 33 are formed at predetermined positions in the width direction. The operation member 35 is provided with a pair of rotation support portions 36 and 36 on both side portions in the width direction, and a lever 37 is provided to protrude from a predetermined position in the width direction on the back side of the rotation support portions 36 and 36. By inserting the pair of shaft portions 31 into shaft holes 36a and 36a of the pair of rotation support portions 36 and 36, the operation member 35 is rotatably attached to the front surface side of the base member 30. The lever 37 is inserted into the notch 33.

Further, the rotation member 40 includes a main body 41 having a substantially disk shape, a support shaft 42 erected from a surface center of the main body 41, a pair of rod attachment portions 43 and 43 provided to protrude from a back side of the main body 41, and a receiving portion (not shown) provided on a front side of the main body 41 and receiving the lever 37. The support shaft 42 is inserted into and pivotally supported by the shaft support hole 32 of the base member 30, and thus the rotation member 40 is rotatably mounted on the back side of the base member 30. When the rotation member 40 is rotationally biased by the biasing unit (not shown), the tip end portions 53 and 53 of the rods 50 and 51 coupled to the rotation member 40 are biased in a direction to be engaged with the lock portions 13 and 13.

In the present embodiment, as described above, although the present invention is applied to, for example, a structure in which a box-shaped glove box is rotatably attached to an opening portion of an instrument panel (in this case, the instrument panel is the "fixed body" and the glove box is the "opening and closing body"), the present invention may be applied to a structure in which a lid is openably and closably attached to an opening portion of an instrument panel (in this case, the instrument panel is the "fixed body" and the lid is the "opening and closing body"), or can be widely used in various kinds of opening and closing bodies which open and close the opening portion of the fixed body.

Further, in the present embodiment, the lock portions 13 are formed on inner surfaces of both sides of the opening portions 12 of the fixed bodies 11 in the width direction. Although the pair of rods 50 and 51 are slidably disposed on the opening and closing body 15, the lock portion may be formed on an opening and closing body side, and the rods may be slidably disposed on a fixed body side.

Figure 4:
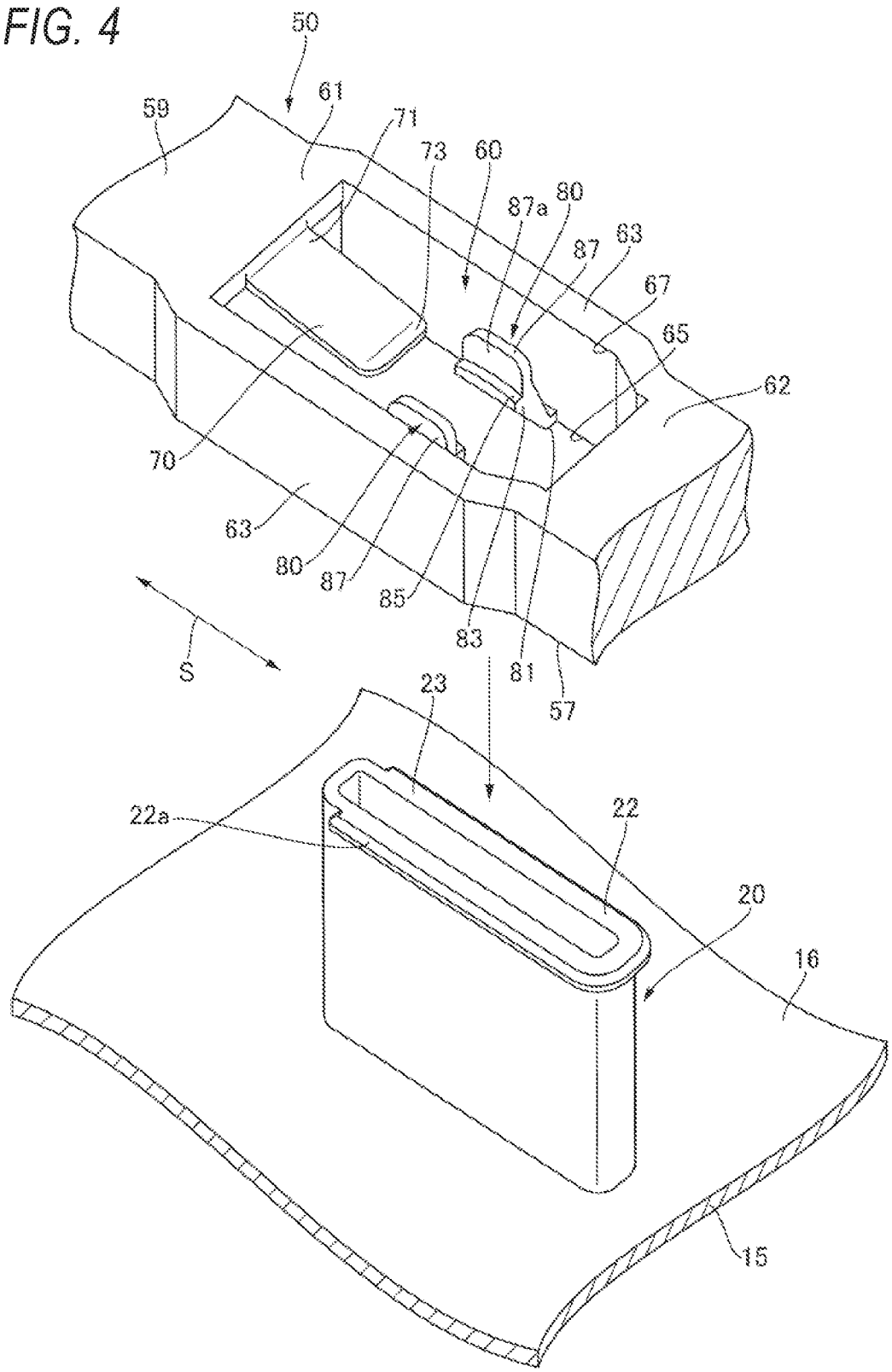
FIG. 4 is an enlarged perspective view showing a recess of a rod and a protrusion in the locking device.

As shown in FIG. 4, a protrusion 20 is provided to protrude from a predetermined portion on the back surface side of the opening and closing body 15. The protrusion 20 extends long in the width direction of the opening and closing body 15 (a left-right direction of the vehicle), and has a tubular shape in which corner portions at both end portions in the longitudinal direction are rounded. In the present embodiment, the protrusion 20 protrudes from the back surface of the opening and closing body 15, and the rod 50 is slidably disposed on the back surface side of the opening and closing body 15 via the protrusion 20. Such a surface of the opening and closing body 15 from which the protrusion 20 protrudes and on which the rod is disposed is referred to as a "rod disposition surface 16" (even when the opening and closing body includes the outer panel and the inner panel and the rod is disposed between the outer panel and the inner panel, a protrusion surface of the protrusion is the "rod disposition surface").

A flange portion 22 that extends outward in a flange shape is provided from an outer periphery of a tip end portion of the protrusion 20 in a protrusion direction. The flange portion 22 in the present embodiment is provided so as to surround the tip end portion of the protrusion 20 in the protrusion direction except for one end portion in the longitudinal direction. As shown in FIG. 4, a tapered surface 22a is formed on an outer peripheral edge portion of a tip end side of the flange portion 22 (a side away from the rod disposition surface 16) so that a protrusion amount from a side surface of the protrusion gradually decreases in a direction away from the rod disposition surface 16. The protrusion 20 having such a structure is inserted and disposed inside the recess 60 provided in the rod 50. The protrusion may be disposed inside and outside the recess of the rod (the configuration will be described in another embodiment to be described later).

The pair of rods 50 and 51 have a shape extending in a rod shape. The tip end portions 53 and 53 of the pair of rods 50 and 51 in an axial direction (extending direction) engage and disengage from the pair of lock portions 13 and 13. In the present embodiment, one rod 50 is formed longer than the other rod 51. Attachment recessed portions 56 and 56 are formed in base end portions 54 and 54 of the rods 50 and 51 in the axial direction. The base end portions 54 and 54 of the pair of rods 50 and 51 are rotatably coupled to the rotation member 40 by inserting and fitting the spherical rod attachment portions 43 and 43 of the rotation member 40 into the attachment recessed portions 56 and 56. When the rotation member 40 rotates in a predetermined direction, the pair of rods 50 and 51 are synchronously slid in the predetermined direction (here, a direction along the longitudinal direction of the opening and closing body 15) via the rotation member 40. A direction in which the pair of rods 50 and 51 slide is referred to as a sliding direction S (see FIGS. 2 and 4).

The pair of rods 50 and 51 in the present embodiment is slidably disposed on the back surface (the rod disposition surface 16) side of the opening and closing body 15. At this time, a surface of the rods 50 and 51 facing the rod disposition surface 16 of other member (here, the opening and closing body 15) is defined as a "bottom surface 57", and a surface away from the rod disposition surface 16 and opposite to the bottom surface 57 is defined as a "ceiling surface 59" (see FIG. 6).

On the longer rod 50 among the pair of rods 50 and 51, the recess 60 surrounded by a pair of first walls 61 and 62 disposed to face each other in the sliding direction S of the rod 50 and a pair of second walls 63 and 63 disposed to face each other in a direction orthogonal to the sliding direction S is provided.

As shown in FIGS. 1 and 4, the pair of first walls 61 and 62 are disposed parallel to each other, and the pair of second walls 63 and 63 are also disposed parallel to each other. The recess 60 has a substantially rectangular shape extending long in the axial direction (longitudinal direction) of the rod 50. One first wall 61 of the pair of first walls 61 and 62 is disposed on the tip end portion 53 side of the rod 50. The other first wall 62 of the pair of first walls 61 and 62 is disposed on the base end portion 54 side of the rod 50.

Figure 6:
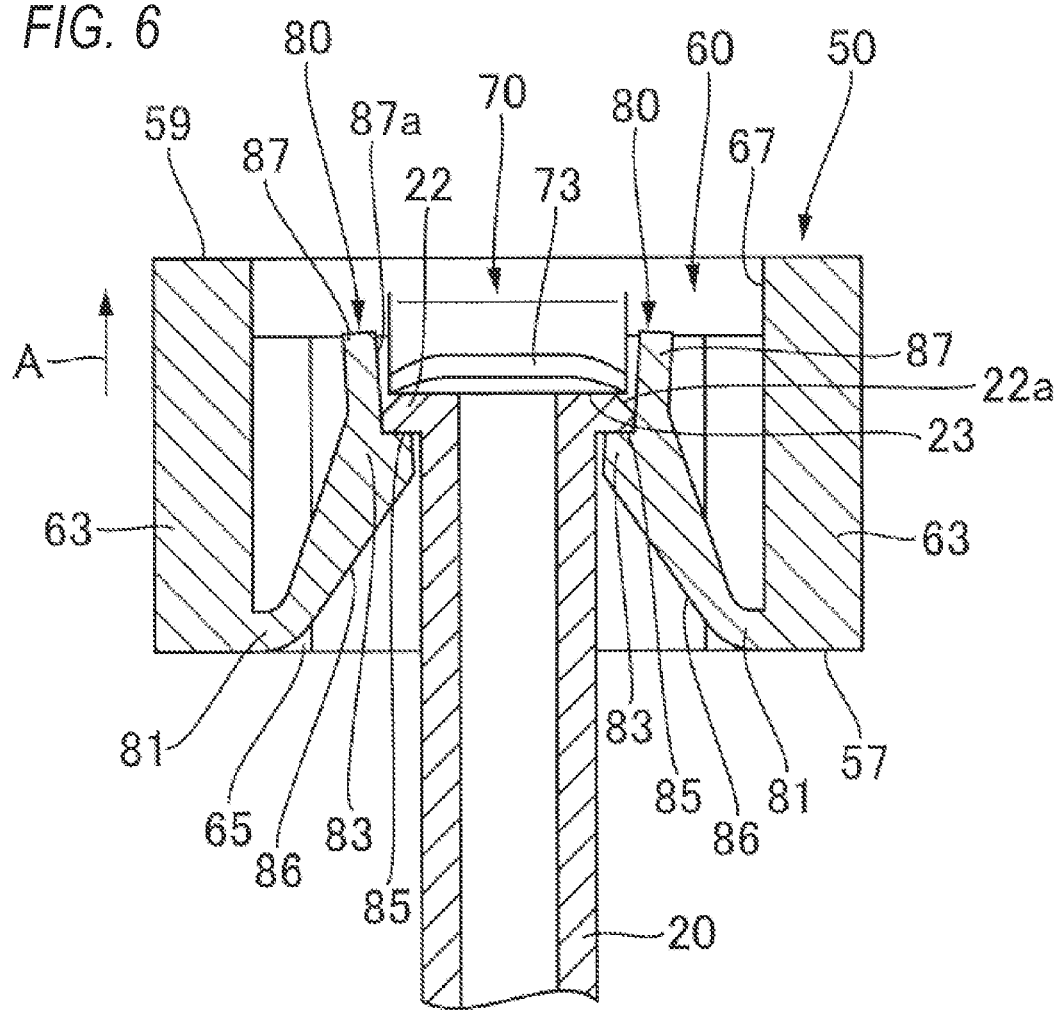
FIG. 6 is a cross-sectional view taken along a line D-D in FIG. 5.
Figure 7:
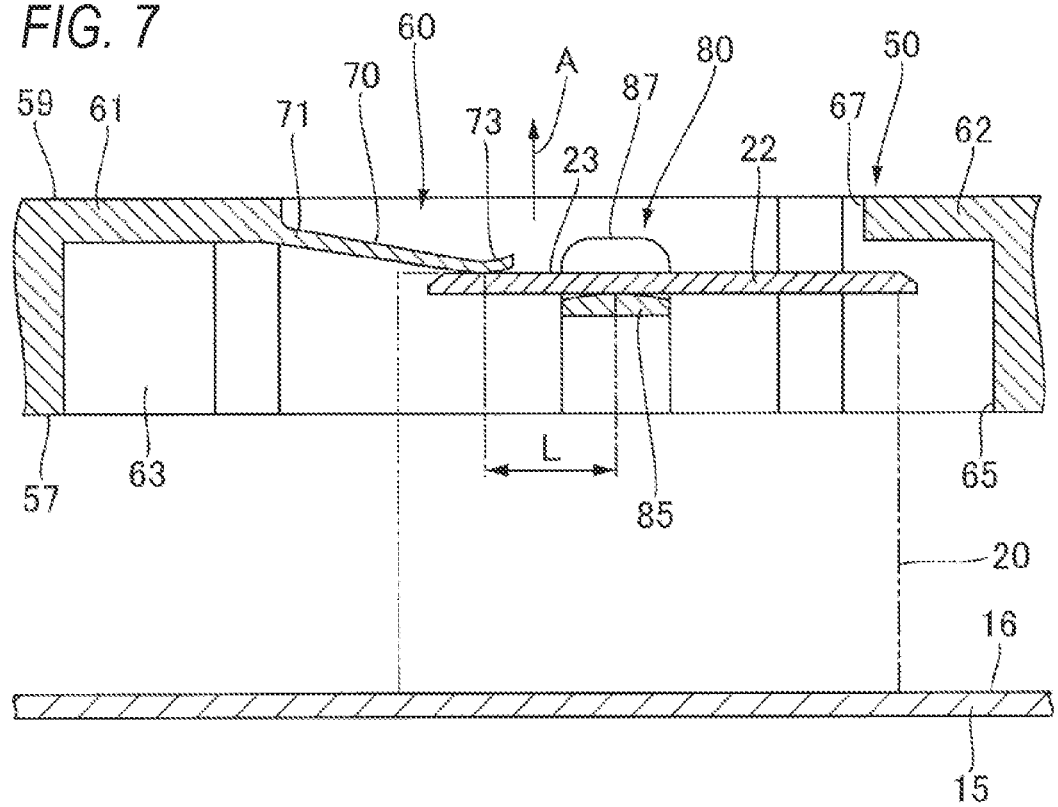
FIG. 7 is a cross-sectional view taken along a line E-E in FIG. 5.

Further, as shown in FIGS. 6 and 7, the recess 60 opens from the bottom surface 57 side of the rod 50 toward the ceiling surface 59. In the recess 60) according to the present embodiment, a bottom surface side opening 65 is formed on the bottom surface 57 side of the rod 50, a ceiling surface side opening 67 is also formed on the ceiling surface 59 side of the rod 50. The recess 60 has a shape penetrating in a thickness direction of the rod 50 (a direction orthogonal to the rod disposition surface 16). The protrusion 20 is inserted into the recess 60 from the bottom surface side opening 65. As shown in FIG. 7, an opening area of the bottom surface side opening 65 is larger than an opening area of the ceiling surface side opening 67, and the protrusion 20 is easily inserted. However, the recess may be, for example, a recess in which the rod ceiling surface side is closed and the rod bottom surface side is opened. That is, the recess has not only the penetration shape but also a recessed shape having a bottom portion or a ceiling portion, such as a recess or a groove shape having a predetermined depth, and the protrusion may be inserted into the recess.

The rod 50 includes a first elastic piece 70 extending from one first wall 61 toward the other first wall 62 and elastically abutting against a tip end surface 23 of the protrusion 20 in the protruding direction to apply an elastic force, and a pair of second elastic pieces 80 and 80 extending from inner surfaces of the pair of second walls 63 and 63.

As shown in FIGS. 4 and 6, a base end 71 (fixed end) of the first elastic piece 70 in the present embodiment is connected to a center of an inner surface of the one first wall 61 in the width direction (the direction orthogonal to the sliding direction S), which is a portion aligned with the ceiling surface side opening 67. As shown in FIG. 7, the base end 71 extends toward the other first wall 62 and obliquely toward the bottom surface side opening 65. A tip end 73 (free end) of the base end 71 in the extending direction is obliquely folded toward the ceiling surface side opening 67. The tip end 73 of the first elastic piece 70 is abutted against the tip end surface 23 of the protrusion 20 to be deflected and deformed. That is, the tip end 73 of the first elastic piece 70 is elastically abutted against the tip end surface 23 of the protrusion 20 to apply the elastic force to the protrusion 20. The rod 50 itself is moved, by a reaction force, in an arrow A direction in FIG. 7 (the direction away from the rod disposition surface 16 of the opening and closing body 15).

Each second elastic piece 80 has a receiving surface 85 that engages with the back surface of the flange portion 22 of the protrusion 20, and is constituted to elastically abut against the side surface of the protrusion 20 (here, an outer peripheral surface of the flange portion 22). Further, the pair of second elastic pieces 80 and 80 extend from the bottom surface side opening 65 to the ceiling surface side opening 67 of the recess 60 on the inner surface sides of the pair of second walls 63 and 63 so as to be close to each other. As a result, the pair of second elastic pieces 80 and 80 have a substantially V-shape.

More specifically, as shown in FIGS. 4, 6, and 7, base ends 81 and 81 (fixed ends) of the pair of second elastic pieces 80 and 80 in the present embodiment are connected to positions slightly closer to the first walls 62 in the inner surfaces of the pair of second walls 63 and 63, which are portions aligned with the bottom surface side opening 65. The base ends 81 and 81 extend obliquely from the base ends 81 and 81 toward the ceiling surface side opening 67 so as to have a gradually increasing thickness, and the receiving surfaces 85 and 85 each having a stepped shape are formed on an inner side portion of a tip end 83 in the extending direction. On inner surfaces of the pair of second elastic pieces 80 and 80 facing each other, tapered surfaces 86 and 86 that gradually narrow in width from the bottom surface side opening 65 of the recess 60 toward the ceiling surface side opening 67 are formed.

Further, as shown in FIG. 7, the receiving surface 85 of each second elastic piece 80 has a shape protruding in an arc shape toward the ceiling surface side opening 67 of the recess 60. As the receiving surface, for example, the receiving surface may have a shape protruding in a mountain shape toward the ceiling surface side opening 67 of the recess 60.

Further, abutting portions 87 and 87 are provided to protrude from positions adjacent to the receiving surfaces 85 and 85, respectively, which are at outer portions of the tip ends 83 in the extending direction of the pair of second elastic pieces 80 and 80. Abutting surfaces 87a and 87a provided on opposing inner surfaces of the abutting portions 87 and 87 elastically abut against the outer surfaces on both side portions in the width direction of the flange portion 22 (also referred to as side surfaces of the protrusion 20) (see FIG. 6).

Then, when the protrusion 20 is inserted into the recess 60 from the bottom surface side opening 65, the protrusion 20 enters between the pair of second elastic pieces 80 and 80, and the flange portion 22 presses the tapered surfaces 86 and 86 of the pair of second elastic pieces 80 and 80, and deflects and deforms the tip ends 83 and 83 in a direction away from each other. At this time, since the tapered surface 22a is formed on the outer peripheral edge portion of the flange portion 22, the protrusion 20 is easily inserted between the pair of second elastic pieces 80 and 80. Thereafter, when the flange portion 22 reaches the receiving surfaces 85 and 85, the pair of second elastic pieces 80 and 80 elastically return, the tip ends 83 and 83 of the pair of second elastic pieces 80 and 80 are deformed in a direction of getting close to each other, the receiving surfaces 85 and 85 are engaged with the back surface of the flange portion 22, and the tip end 73 of the first elastic piece 70 is elastically abutted against the tip end surface 23 of the protrusion 20. Then, as described above, the elastic force is applied to the protrusion 20 by the first elastic piece 70, and the reaction force causes the rod 50 itself to move in the arrow A direction. However, at this time, the receiving surfaces 85 and 85 are caught by the back surface of the flange portion 22, and thus the movement of the rod 50 in the arrow A direction is restricted. As a result, the protrusion 20 is restricted from coming out from the bottom surface side opening 65 of the recess 60. and the protrusion 20 is prevented from falling out from the recess 60.

As described above, in a state in which the receiving surfaces 85 and 85 of the pair of elastic pieces 80 and 80 are engaged with the back surface of the flange portion 22, the pair of second elastic pieces 80 and 80, which are pressed in directions away from each other by the protrusion 20, elastically return, and the tip ends 83 and 83 thereof are deformed in the direction of getting close to each other. Therefore, the abutting surfaces 87a and 87a, of the abutting portions 87 and 87 of the pair of second elastic pieces 80 and 80 elastically abut against the outer surfaces of both side portions in the width direction of the flange portion 22.

In the present embodiment, the recess 60 is provided only in the rod 50 of the pair of rods 50 and 51. whereas the recess 60 may be provided in the rod 51, or the recess 60 may be provided only in the rod 51. Further, the shapes of the first elastic pieces and the pair of second elastic pieces, the formed positions, and the like are not limited to those described above. For example, the first elastic piece 70 may extend from the first wall 62 side toward the first wall 61 side.

Next, the operation and effect of the locking device 10 having the above configuration will be described.

Figure 5:
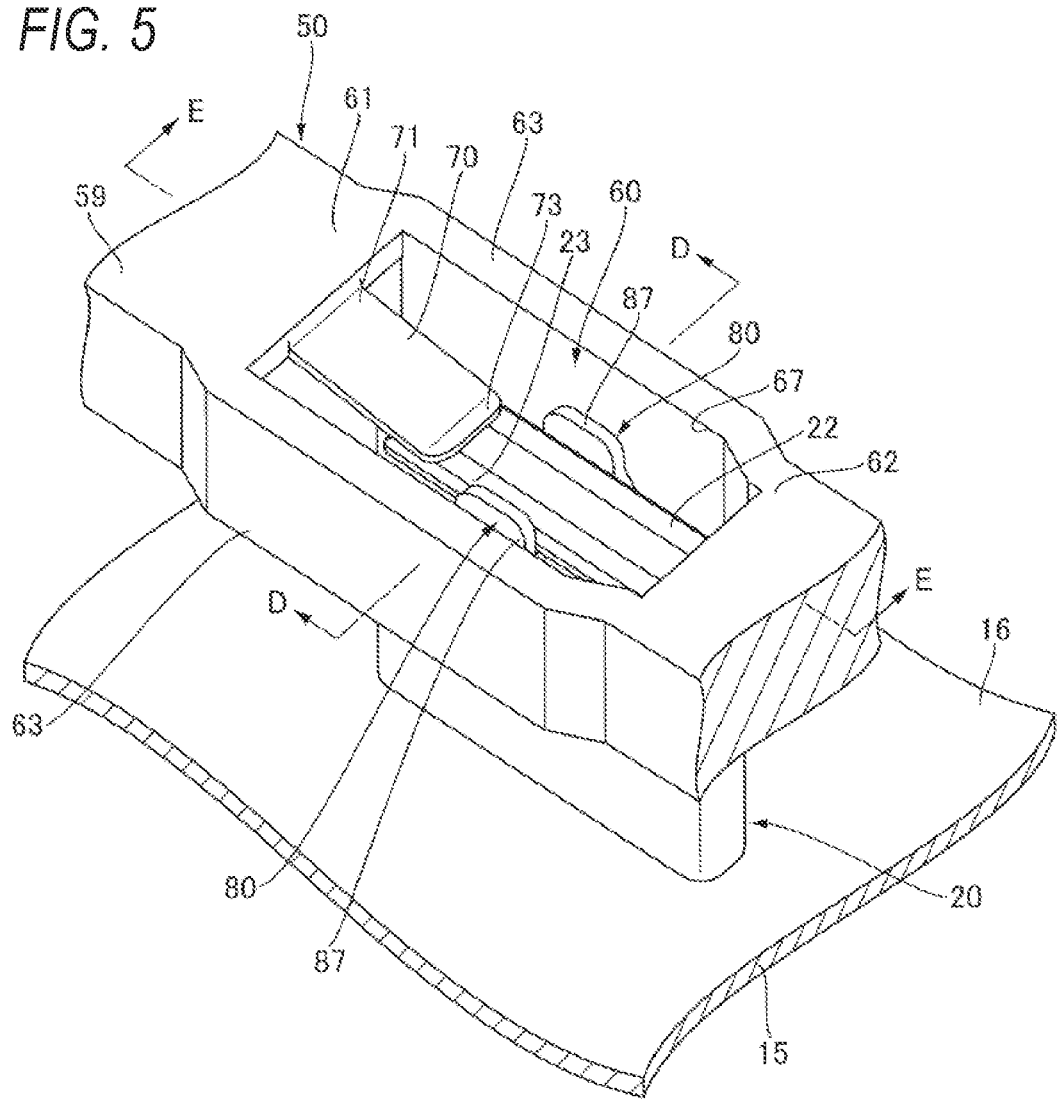
FIG. 5 is an enlarged perspective view of the locking device in a state where the protrusion is inserted into the recess of the rod and the rod is disposed on a rod disposition surface.

First, the protrusion 20 is disposed inside the recess 60. That is, as shown in FIG. 4, after the protrusion 20 is aligned in the recess 60, the rod 50 is pushed toward the rod disposition surface 16 of the opening and closing body 15, and the protrusion 20 is inserted into the recess 60 from the bottom surface side opening 65. Then, when the flange portion 22 of the protrusion 20 presses the pair of second elastic pieces 80 and 80 from the tapered surfaces 86 and 86 side and deflects and deforms, and then the flange portion 22 reaches the receiving surfaces 85 and 85, the pair of second elastic pieces 80 and 80 elastically return, and the receiving surfaces 85 and 85 are engaged with the back surface of the flange portion 22. At the same time, the tip end 73 of the first elastic piece 70 elastically abuts against the tip end surface 23 of the protrusion 20, and the abutting surfaces 87a and 87a of the abutting portions 87 and 87 of the pair of second elastic pieces 80 and 80 elastically abut against the outer surfaces on both sides in the width direction of the flange portion 22. As a result, as shown in FIGS. 5 to 7. the protrusion 20 is inserted and disposed inside the recess 60, the protrusion 20 is prevented from coming out of the recess 60, and the rod 50 can be slidably disposed so as not to be away from the rod disposition surface 16 of the opening and closing body 15.

When the rod 50 is slid, the rod 50 slides on the back surface side of the flange portion 22 while the receiving surface 85 is in sliding contact with the receiving surface 85. At this time, in the present embodiment, as shown in FIG. 7, the receiving surface 85 of each second elastic piece 80 has a shape protruding in the arc shape toward the ceiling surface side opening 67 of the recess 60. When the rod 50 is slid, mainly, a top portion of an arc-shaped protruding portion on the receiving surface 85 is partially in sliding contact with the back surface side of the flange portion 22. Therefore, a contact area between the back surface of the flange portion and the receiving surface 85 can be reduced, sliding contact resistance of the rod 50 can be reduced, and the rod 50 can be easily slid.

In the locking device 10, when the opening and closing body 15 is closed from the state where the opening and closing body 15 is opened from the opening portion 12 of the fixed body 11, the tip end portions 53 and 53 of the pair of rods 50 and 51 are engaged with the lock portions 13 and 13 of the fixed body 11, and thus the opening and closing body 15 is locked in the closed state as shown in FIG. 2.

Figure 3:
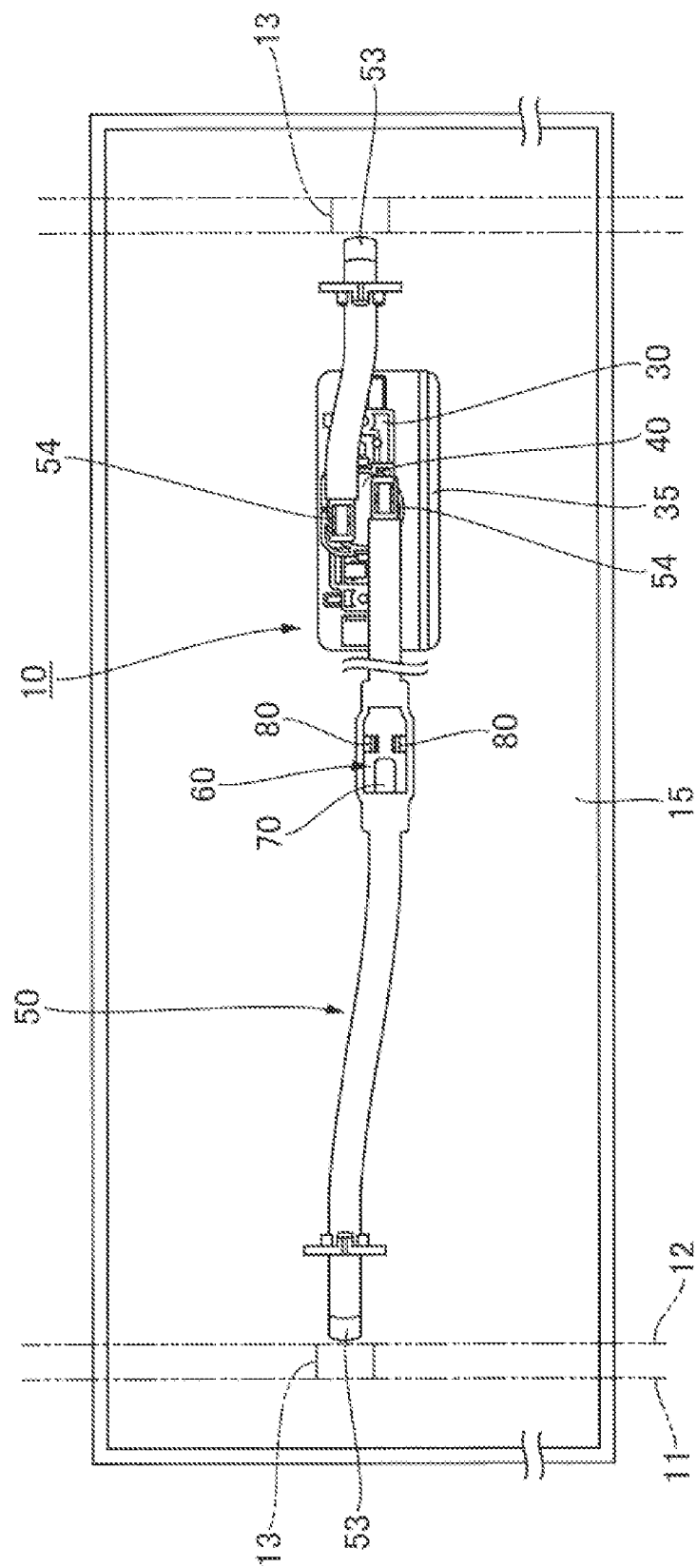
FIG. 3 is an explanatory diagram of the locking device when a lock state of the opening and closing body is released.

When the holding portion 38 of the operation member 35 is rotated in the direction away from the base member 30 from the above state, as shown in FIG. 3, the tip end portions 53 and 53 of the pair of rods 50 and 51 are pulled in a direction not engaged with the lock portions 13 and 13 against a rotational biasing force of the rotation member 40, so that the lock state of the opening and closing body 15 can be released, and the opening and closing body 15 can be opened from the opening portion 12 of the fixed body 11.

In the locking device 10, in a state in which the protrusion 20 is disposed inside the recess 60 provided in the rod 50 and the rod 50 is disposed on the opening and closing body 15, the tip end 73 of the first elastic piece 70 elastically abuts against (elastically contacts) the tip end surface 23 of the protrusion 20, and the pair of second elastic pieces 80 and 80 elastically contact the side surface of the protrusion 20 (here, the abutting surface 87a of the abutting portion 87 of each second elastic piece 80 comes into elastic contact with the outer surface of the flange portion 22 of the protrusion 20). Therefore, rattling of the rod 50 in a vertical direction (here, the front-rear direction of the vehicle) and a parallel direction (the left-right direction of the vehicle) with respect to the rod disposition surface 16 of the opening and closing body 15 which is the other member of the rod 50 is prevented.

At this time, as the tip end 73 of the first elastic piece 70 comes into elastic contact with the tip end surface 23 of the protrusion 20, the reaction force causes the rod 50 to move in the direction away from the rod disposition surface 16 of the other member (here, the opening and closing body 15) (see the arrow A in FIGS. 6 and 7). However, the receiving surfaces 85 and 85 of the pair of second elastic pieces are engaged with the back surface of the flange portion 22 of the protrusion 20, so that the movement of the rod 50 in the direction away from the rod disposition surface 16 of the opening and closing body 15 can be restricted.

Figure 14:
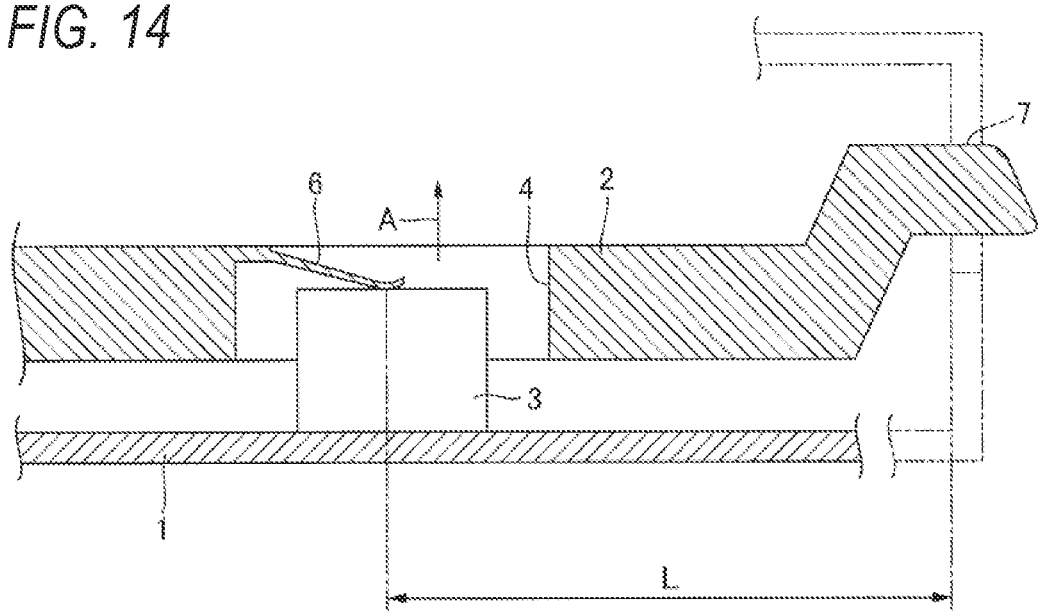
FIG. 14 is an explanatory diagram showing an engagement state between a lock portion and a slide member of a locking device in the related art.

In the locking device 10, since the receiving surfaces 85 and 85 of the second elastic pieces 80 and 80 that restrict the movement of the rod 50 in the direction away from the rod disposition surface 16 of the opening and closing body 15 can be provided on the same rod 50 as the rod 50 provided with the first elastic piece 70, as shown in FIG. 7, a distance L between a portion of the first elastic piece 70 that applies the elastic force to the tip end surface 23 of the protrusion 20 and the receiving surface 85 that restricts the movement of the rod 50 (here, the distance L is from a folded portion of the tip end 73 of the first elastic piece 70 and an apex of the arc-shaped protruding portion of the receiving surface 85) can be made shorter than in the case of an example in the related art as shown in FIG. 14, the deflection amount of the first elastic piece 70 can be stabilized, and the rattling of the rod 50 can be sufficiently prevented. Since the rattling of the rod 50 can be prevented, abnormal noise generated by the rattling of the rod 50 can be effectively prevented.

In the present embodiment, as shown in FIGS. 6 and 7, the recess 60 opens from the bottom surface 57 side of the rod 50 toward the ceiling surface 59 which is opposite to the bottom surface 57. The pair of second elastic pieces 80 and 80 extend from the bottom surface side opening 65 of the recess 60 toward the rod ceiling surface side on the inner surface side of the pair of second walls 63 and 63. Therefore, when the protrusion 20 is inserted from the bottom surface side opening 65 of the recess 60, the pair of second elastic pieces 80 and 80 can be easily deflected (the pair of second elastic pieces 80 and 80 can be pressed from an initial stage of insertion of the protrusion, and a pressing stroke can be secured for a long time), and workability of disposing the rod 50 with respect to the other member (here, the opening and closing body 15) can be enhanced. The positions of the receiving surfaces 85 and 85 of the pair of second elastic pieces 80 and 80 can be made closer to each other by the first elastic piece 70. Since the pair of second elastic pieces 80 and 80 are disposed inside the recess 60, even if an external force or the like acts from the outside of the rod, the pair of second elastic pieces 80 and 80 can be made less likely to be damaged.

In the present embodiment, the pair of second elastic pieces 80 and 80 extend from the bottom surface side opening 65 of the recess 60 to the rod ceiling surface side opening on the inner surface sides of the pair of second walls 63 and 63 so as to be close to each other. Therefore, it is easy to secure a deflection margin of the pair of second elastic pieces 80 and 80. The pair of second elastic pieces 80 and 80 can be more easily deflected when the protrusion 20 is inserted from the bottom surface side opening 65 of the recess 60.

Figure 8:
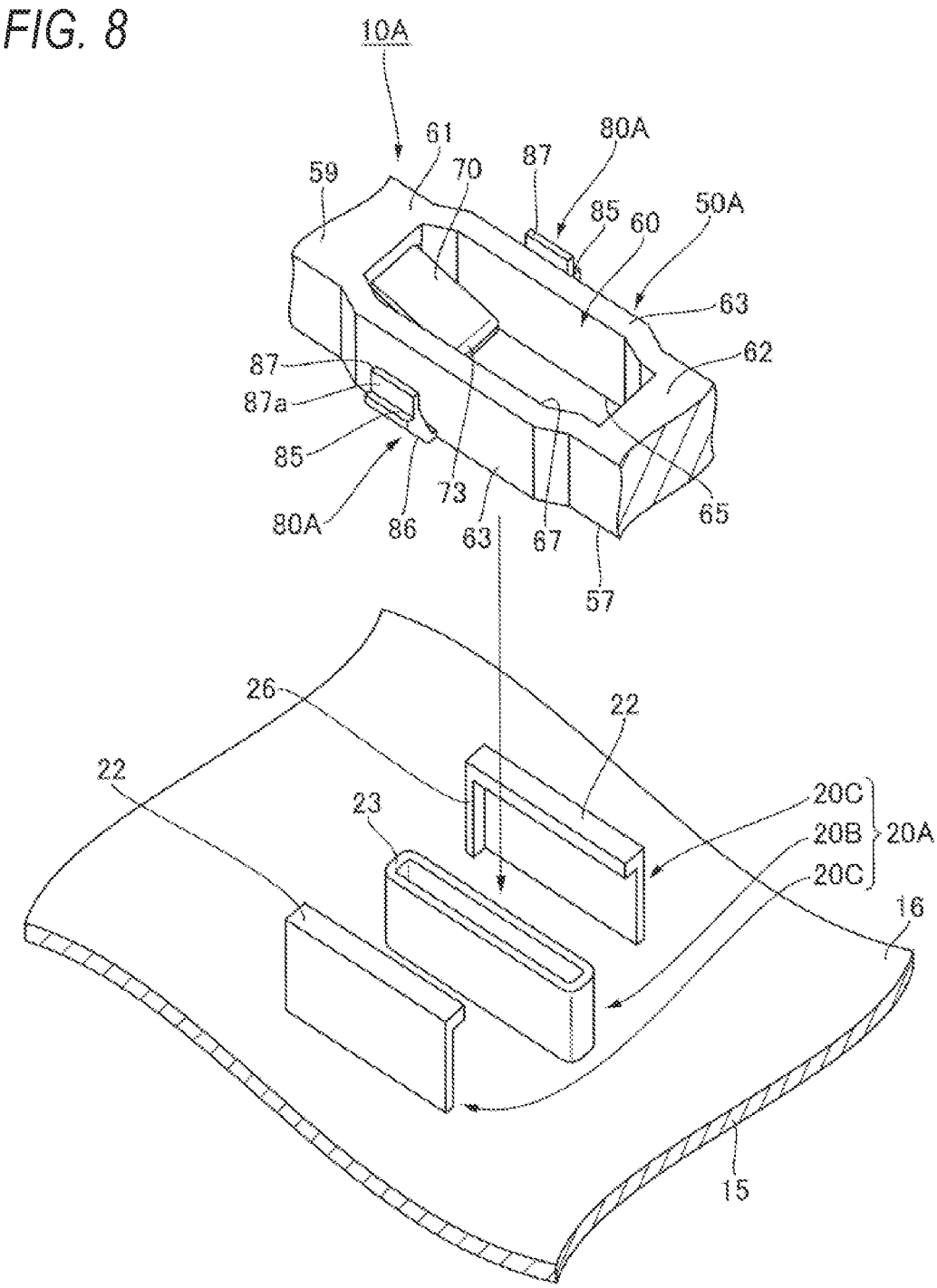
FIG. 8 is an enlarged perspective view of a main part of a locking device for an opening and closing body according to another embodiment of the present invention.
Figure 9:
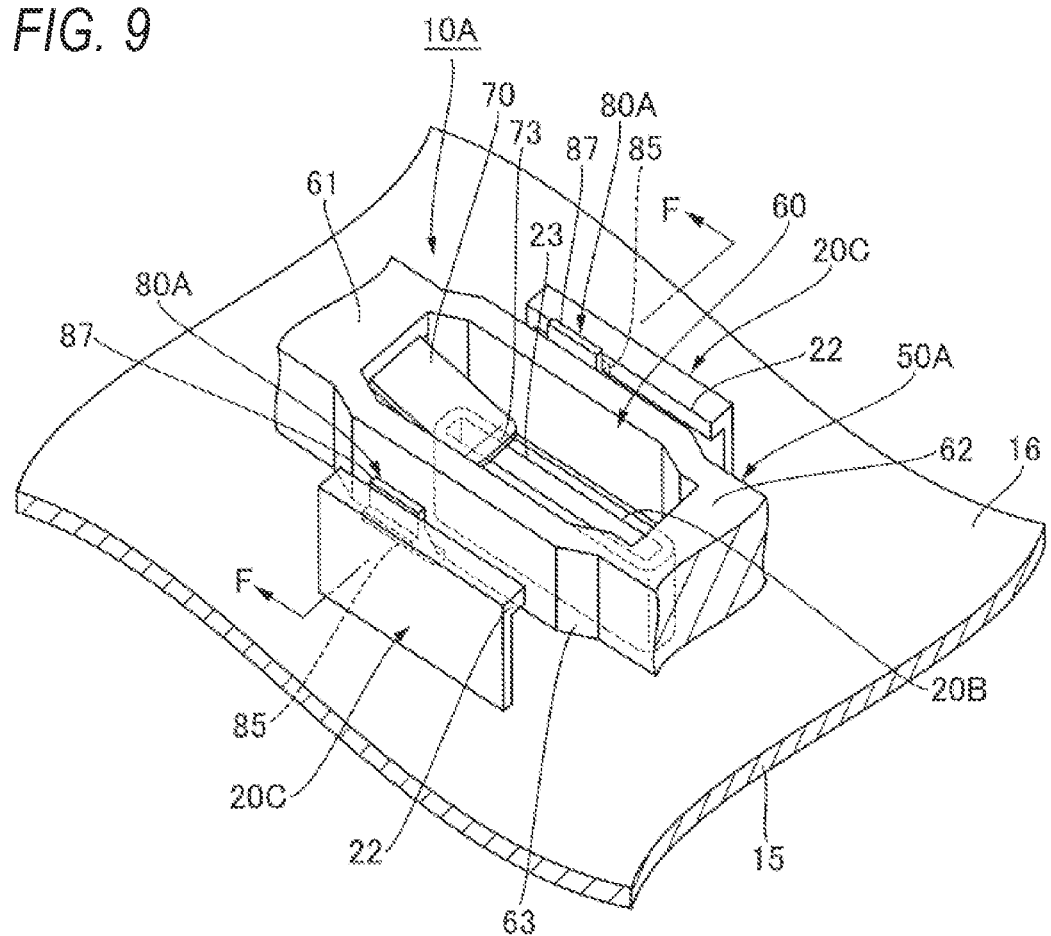
FIG. 9 is an enlarged perspective view of the locking device in a state where a protrusion is inserted into a recess of a rod and the rod is disposed on a rod disposition surface.
Figure 10:
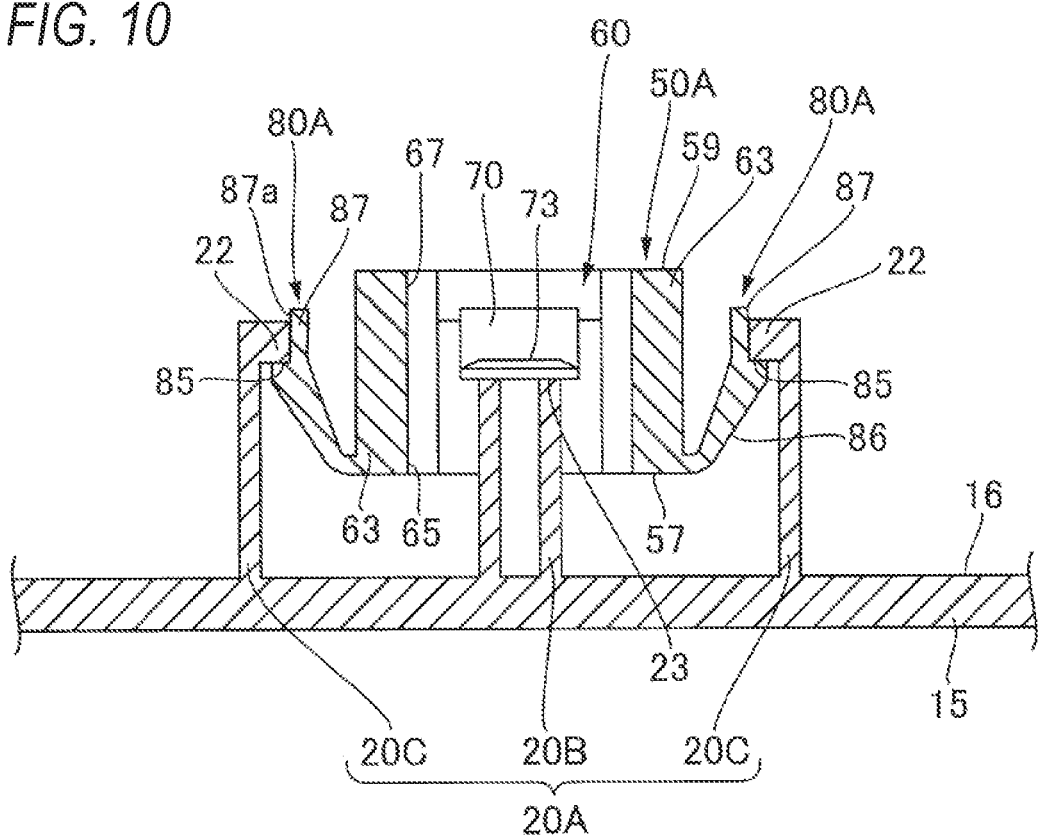
FIG. 10 is a cross-sectional view taken along a line F-F in FIG. 9.

FIGS. 8 to 10 show another embodiment of a locking device for an opening and closing body according to the present invention. Substantially the same parts as those in the above-described embodiment are denoted by the same reference signs, and description thereof will be omitted.

A locking device 10A of an opening and closing body (hereinafter, the "locking device 10A") according to the present embodiment is different from the above-described embodiment in a structure of a rod 50A and a protrusion 20A.

As shown in FIGS. 8 and 10, a pair of second elastic pieces 80A and 80A extend from outer surfaces of the pair of second walls 63 and 63 forming the recess 60 of the rod 50A. More specifically, the pair of second elastic pieces 80A and 80A extend from a peripheral portion of the bottom surface 57 of the rod 50A on the outer surfaces of the pair of second walls 63 and 63, and extend so as to be away from each other toward the ceiling surface 59 of the rod 50A.

The second elastic pieces 80A basically have the same shape as the second elastic pieces 80 of the above-described embodiment. However, outer surfaces of the pair of second elastic pieces 80A and 80A that are away from each other form the tapered surfaces 86 and 86 that gradually increase in width toward a rod ceiling surface side, and outer surfaces of the abutting portions 87 and 87 that are away from each other form abutting surfaces 87a and 87a that elastically contact the side surfaces of the protrusion. As shown in FIG. 8, the first elastic piece 80 extending from the first wall 61 extends so as to be located between the pair of second elastic pieces 80A and 80A.

On the other hand, as shown in FIGS. 8 and 9, the protrusion 20A includes a first protrusion 20B that is inserted and disposed inside the recess 60 of the rod 50A, and a pair of first protrusions 20C and 20C that are provided parallel to each other at a predetermined distance from both outer surfaces along a longitudinal direction of the first protrusion 20B and that are disposed outside the recess 60 of the rod 50A. In other words, one first protrusion 20B is disposed between the pair of first protrusions 20C and 20C. The first protrusion 20B has a shape in which the flange portion 22 does not exist at a tip end in a protruding direction. On the other hand, the flange portion 22 is provided to protrude on each inner surface side of the pair of second protrusions 20C and 20C (a surface facing the first protrusion 20C) and on a tip end side in the protruding direction of the pair of second protrusions 20C and 20C. On the inner surface side of each second protrusion 20C and on one end side in the longitudinal direction (the first wall 61 side of the rod 50A), a wall portion 26 extending orthogonal to the rod disposition surface 16 and connected to one end of the flange portion 22 is provided to protrude therefrom. The wall portion 26 reinforces the first protrusion 20C.

In the locking device 10A, as shown in FIG. 8, after aligning the first protrusion 20B inside the recess 60 of the rod 50A and aligning the pair of second protrusions 20C and 20C outside the recess 60 of the rod 50A, the rod 50A is pushed toward the rod disposition surface 16 of the opening and closing body 15. Then, the first protrusion 20B is inserted into the recess 60 from the bottom surface side opening 65, and the flange portions 22 and 22 press the tapered surfaces 86 and 86 of the pair of second elastic pieces 80A and 80A to deflect and deform inward. When the flange portions 22 reaches the receiving surfaces 85 and 85, the pair of second elastic pieces 80A and 80A elastically return, and the receiving surfaces 85 and 85 are engaged with the back surface of the flange portions 22. At the same time, the tip end surface 73 of the first elastic piece 70 elastically abuts against the tip end surface 23 of the first protrusion 20B, and the abutting surfaces 87a and 87a of the abutting portions 87 and 87 of the pair of second elastic pieces 80A and 80A elastically contact the inner surfaces of the flange portions 22. As a result, as shown in FIGS. 9 and 10, the first protrusion 20B is disposed inside the recess 60, and the pair of second protrusions 20C and 20C are disposed outside the recess 60. Therefore, the first protrusion 20B can be held so as not to come out from the recess 60, and the rod 50A can be slidably disposed so as not to be away from the rod disposition surface 16 of the opening and closing body 15.

In the present embodiment, as described above, since the first elastic piece 70 extends so as to be positioned between the pair of second elastic pieces 80A and 80A (see FIGS. 8 and 9), a distance between a portion of the first elastic piece 70 that applies the elastic force to the tip end surface 23 of the protrusion (here, the first protrusion 20B) and the receiving surface 85 that restricts the movement of the rod 50A of the second elastic piece 80A can be further shortened, and the deflection amount of the first elastic piece 70 can be further stabilized.

Figure 11:
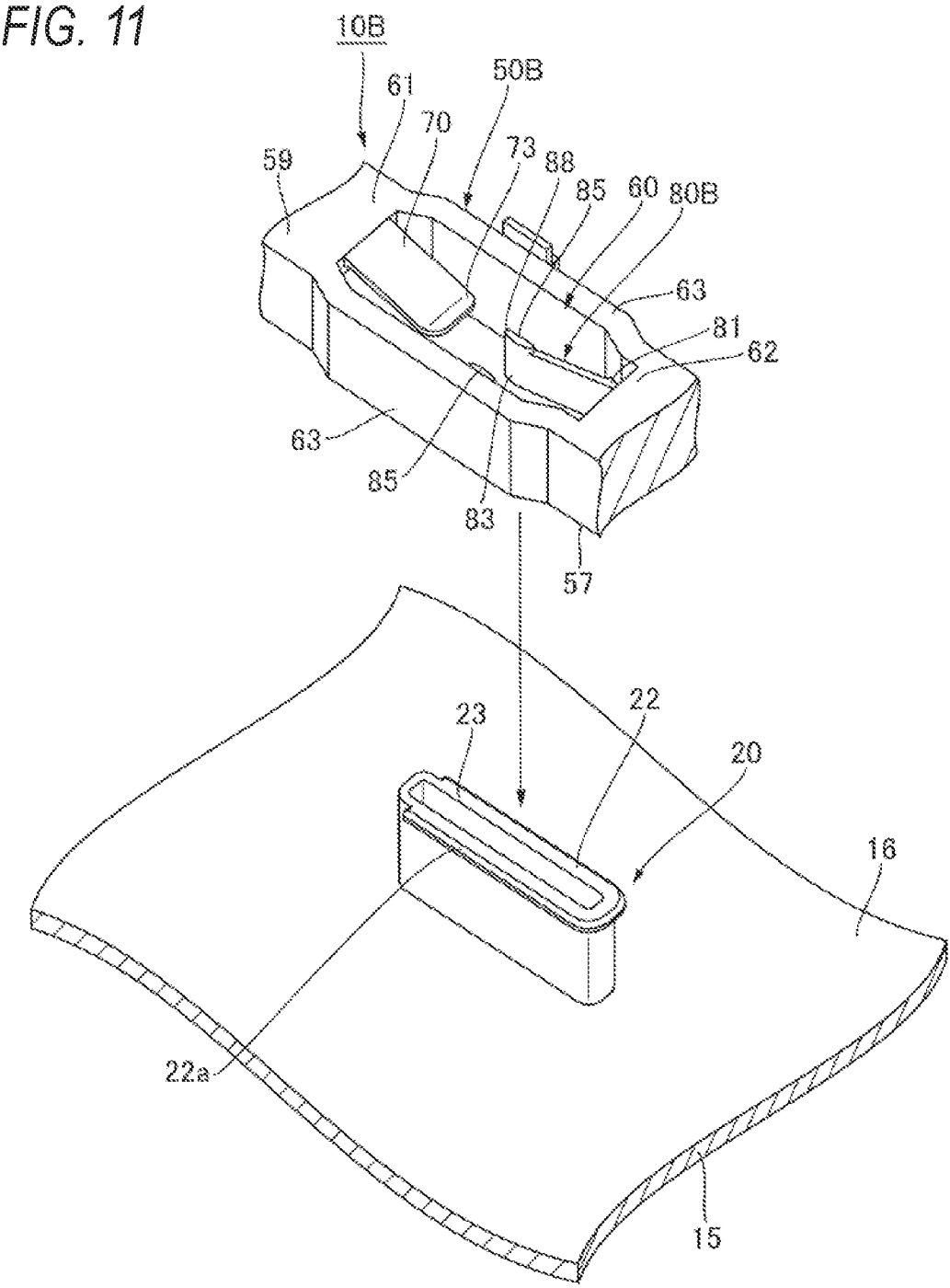
FIG. 11 is an enlarged perspective view of a main part of a locking device for an opening and closing body according to still another embodiment of the present invention.
Figure 12:
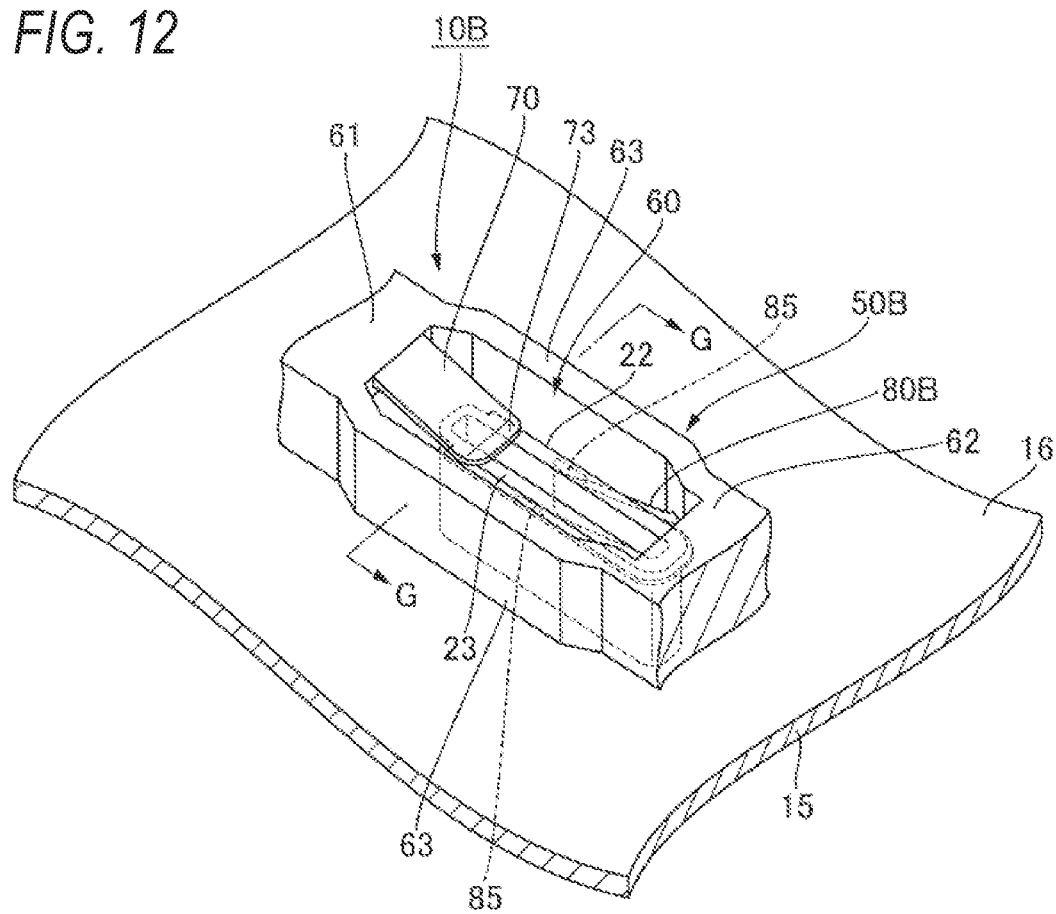
FIG. 12 is an enlarged perspective view of the locking device in a state where a protrusion is inserted into a recess of a rod and the rod is disposed on a rod disposition surface.
Figure 13:
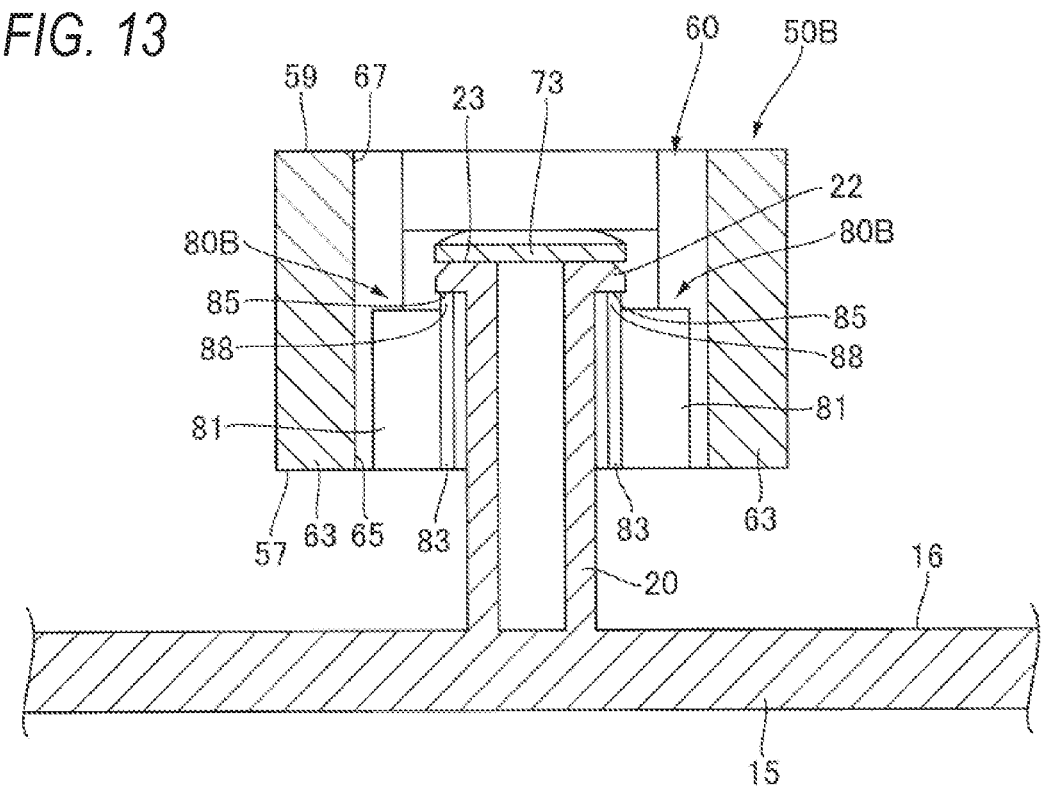
FIG. 13 is a cross-sectional view taken along a line G-G in FIG. 12.

FIGS. 11 to 13 show still another embodiment of a locking device for an opening and closing body according to the present invention. Substantially the same parts as those in the above-described embodiment are denoted by the same reference signs, and description thereof will be omitted.

A locking device 10B of an opening and closing body (hereinafter, the "locking device 10B") according to the present embodiment is different from the embodiment shown in FIGS. 1 to 7 in a structure of the rod 50B. That is, as shown in FIG. 11, the base ends 81 and 81 of a pair of second elastic pieces 80B and 80B are connected to the pair of second walls 63 and 63 forming the recess 60 at a side of the first wall 62. The tip ends 83 and 83 extend away from the corresponding second wall 63 (the second wall 63 to which the base end 81 is connected) toward the first wall 61 side.

Side edge portions of the pair of second elastic pieces 80B and 80B on the tip ends 83 and 83 side form the receiving surfaces 85. Here, a protrusion 88 is provided to protrude from a side edge portion of on an upper end side on the tip end 83 in an extending direction of each second elastic piece 80B (the ceiling surface side opening 67 side of the recess 60). An end surface of the protrusion 88 forms the receiving surface 85 to be engaged with the back surface of the flange portion 22 of the protrusion 20.

In the locking device 10B, as shown in FIG. 11, after the protrusion 20 is aligned inside the recess 60, the rod 50B is pushed toward the rod disposition surface 16 of the opening and closing body 15. Then, by the tapered surface 22a of the flange portion 22 of the protrusion 20, side edge portions of lower end sides of the pair of second elastic pieces 80B and 80B (the bottom surface side opening 65 side of the recess 60) are pressed, the pair of second. elastic pieces 80B and 80B are pushed and expanded, and the protrusion 20 enters between the pair of second elastic pieces 80B and 80B. Further, when the rod 50B is pushed and the flange portion 22 comes out from the upper end sides of the pair of second elastic pieces 80B and 80B, the pair of second elastic pieces 80B and 80B elastically return, and the receiving surfaces 85 and 85 provided on the end surfaces of the protrusions 88 and 88 are engaged with the back surface side of the flange portion 22. At the same time, the tip end 73 of the first elastic piece 70 elastically abuts against the tip end surface 23 of the protrusion 20, and the inner surfaces of the tip ends 83 and 83 of the pair of second elastic pieces 80B and 80B elastically abut against the outer surfaces on both sides in a width direction of the flange portion 22. As a result, as shown in FIGS. 12 and 13, the protrusion 20 is inserted and disposed inside the recess 60, the protrusion 20 is prevented from coming out of the recess 60, and the rod 50B can be slidably disposed so as not to be away from the rod disposition surface 16 of the opening and closing body 15.

In the present embodiment, as described above, the base ends 81 and 81 of the pair of second elastic pieces 80B and 80B are connected to the pair of second walls 63 and 63 at the side of the first wall 62, the tip ends 83 and 83 extend away from the corresponding second wall 63 toward the first wall 61 side, and the side edge portions on the tip ends 83 and 83 side of the pair of second elastic pieces 80B and 80B form the receiving surfaces 85 and 85. Therefore, the pair of second elastic pieces 80B and 80B extend from a side opposite to the first elastic piece 70, so that it is possible to secure the elasticity of the pair of second elastic pieces 80B and 80B to secure ease of deflection, and it is possible to secure a large engagement area of the receiving surfaces 85 and 85 with respect to the back surface of the flange portion 22.

The present invention is not limited to the above-described embodiments, and various modifications are possible within the scope of the gist of the present invention, and such embodiments are also included in the scope of the present invention.

REFERENCE SIGNS LIST 10, 10A, 10B locking device of opening and closing body (locking device)
11 fixed body
12 opening portion
13 lock portion
15 opening and closing body
20, 20A protrusion
22 flange portion
30 base member
35 operation member
40 rotation member
50, 50A, 50B, 51 rod
60 recess
61, 62 first wall
63, 63 second wall
65 bottom surface side opening
67 ceiling surface side opening
70 first elastic piece
80, 80A, 80B second elastic piece
85 receiving surface
87 abutting portion

The invention claimed is:

1. A locking device for an opening and closing body that is openably and closably attached to an opening portion of a fixed body, the locking device comprising:
   a lock portion provided on one of the fixed body or the opening and closing body;
   a rod disposed on an other member of the fixed body or the opening and closing body and configured to slide via an operation member to engage with and disengage from the lock portion; and
   a protrusion protruding from the other member of the fixed body or the opening and closing body, wherein
   the rod has a recess surrounded by a pair of first walls disposed to face each other in a sliding direction of the rod and a pair of second walls disposed to face each other in a direction orthogonal to the sliding direction,
   the protrusion is disposed inside the recess or inside and outside the recess, and is provided with a flange portion provided on a tip end side in a protruding direction of the protrusion,
   the rod has a first elastic piece that extends from one of the pair of first walls toward an other of the pair of first walls and applies an elastic force by being elastically abutted against a tip end surface of the protrusion in the protruding direction, and a pair of second elastic pieces that extend from an inner surface or an outer surface of the pair of second walls,
   each of the second elastic pieces has a receiving surface that engages with a back surface of the flange portion, and is configured to elastically abut against a side surface of the protrusion; and
   the rod is configured to move with respect to the protrusion in the sliding direction.

2. The locking device for the opening and closing body according to claim 1, wherein
   the recess opens from a bottom surface side of the rod toward a ceiling surface on a side opposite to the bottom surface side, and
   the pair of second elastic pieces extend from an opening of the recess on the bottom surface side toward a side of the ceiling surface on a side of the inner surface of the pair of second walls.

3. The locking device for the opening and closing body according to claim 2, wherein
   the pair of second elastic pieces are provided on the inner surface side of the pair of second walls, and extend from the opening of the recess on the bottom surface side toward the side of the ceiling surface so as to be close to each other.

4. The locking device for the opening and closing body according to claim 1, wherein
   base ends of the pair of second elastic pieces are connected to the second wall at a side of one of the first walls, and tip ends of the pair of second elastic pieces extend away from a corresponding second wall toward a side of the other of the first walls, and
   side edge portions on the tip end sides of the pair of second elastic pieces form the receiving surface.

5. The locking device for the opening and closing body according to claim 1, wherein
   the first elastic piece extends so as to be located between the pair of second elastic pieces.

6. The locking device for the opening and closing body according to claim 1, wherein
   each of the pair of second elastic pieces has a fixed end and a free end.

7. The locking device for the opening and closing body according to claim 1, wherein
   each of the pair of second elastic pieces extends so as to form a space between each of the pair of second elastic pieces and the inner surface or the outer surface of each of the pair of second walls.

8. The locking device for the opening and closing body according to claim 1, wherein
   each of the pair of second elastic pieces has a tip end formed in a bifurcated shape.

9. The locking device for the opening and closing body according to claim 1, wherein
   a maximum width of a part of the protrusion in the sliding direction is smaller than a width of the recess in the sliding direction at height where the maximum width is present, the part of the protrusion configured to be disposed inside the recess.

* * * * *